Figure 1:
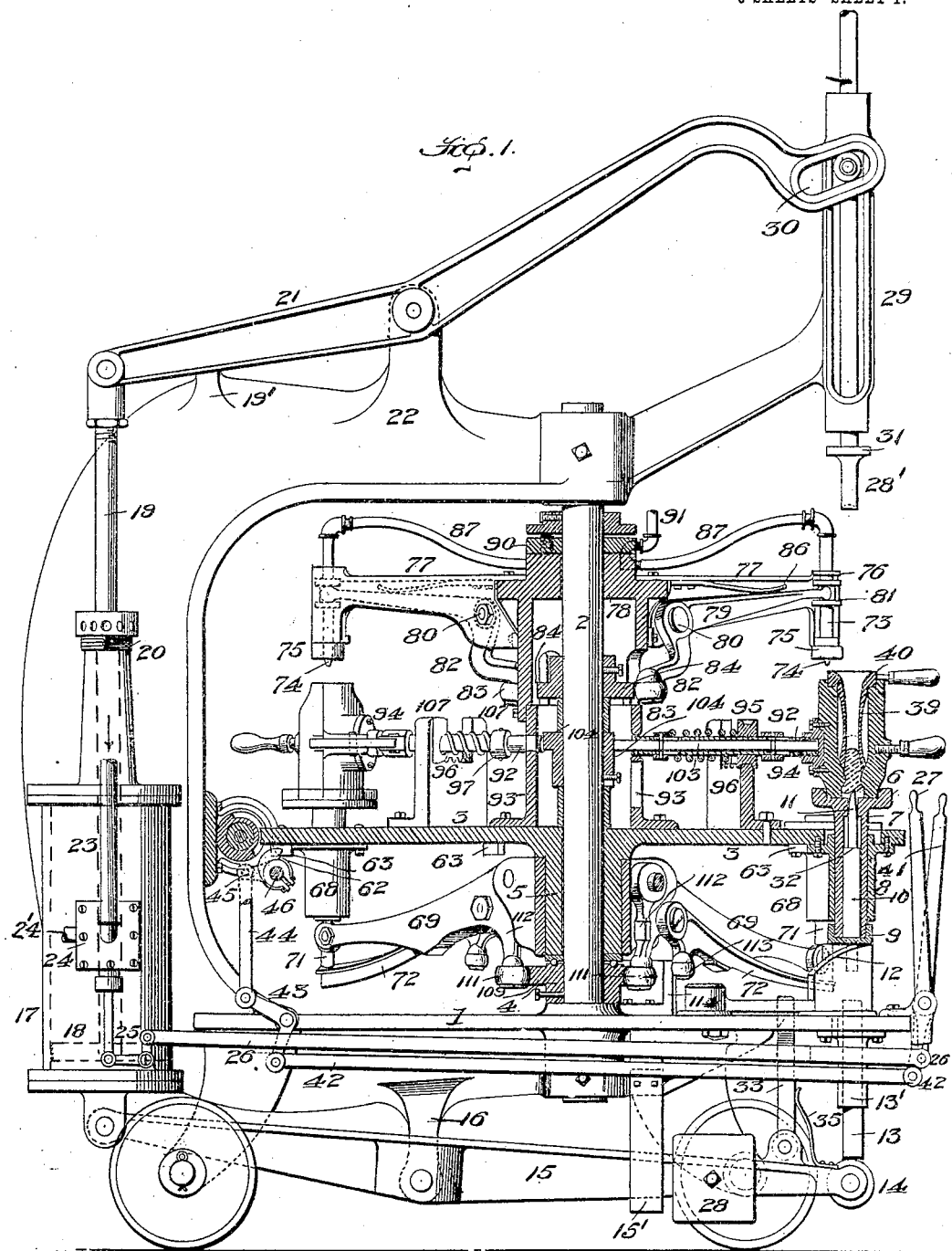

No. 808,874. PATENTED JAN. 2, 1906.
H. SEMPLE.
MACHINE FOR MAKING NECKED GLASS ARTICLES.
APPLICATION FILED AUG. 14, 1903.

6 SHEETS—SHEET 1.

Witnesses

Inventor
Harry Semple
by Johnson and Johnson
Attorneys

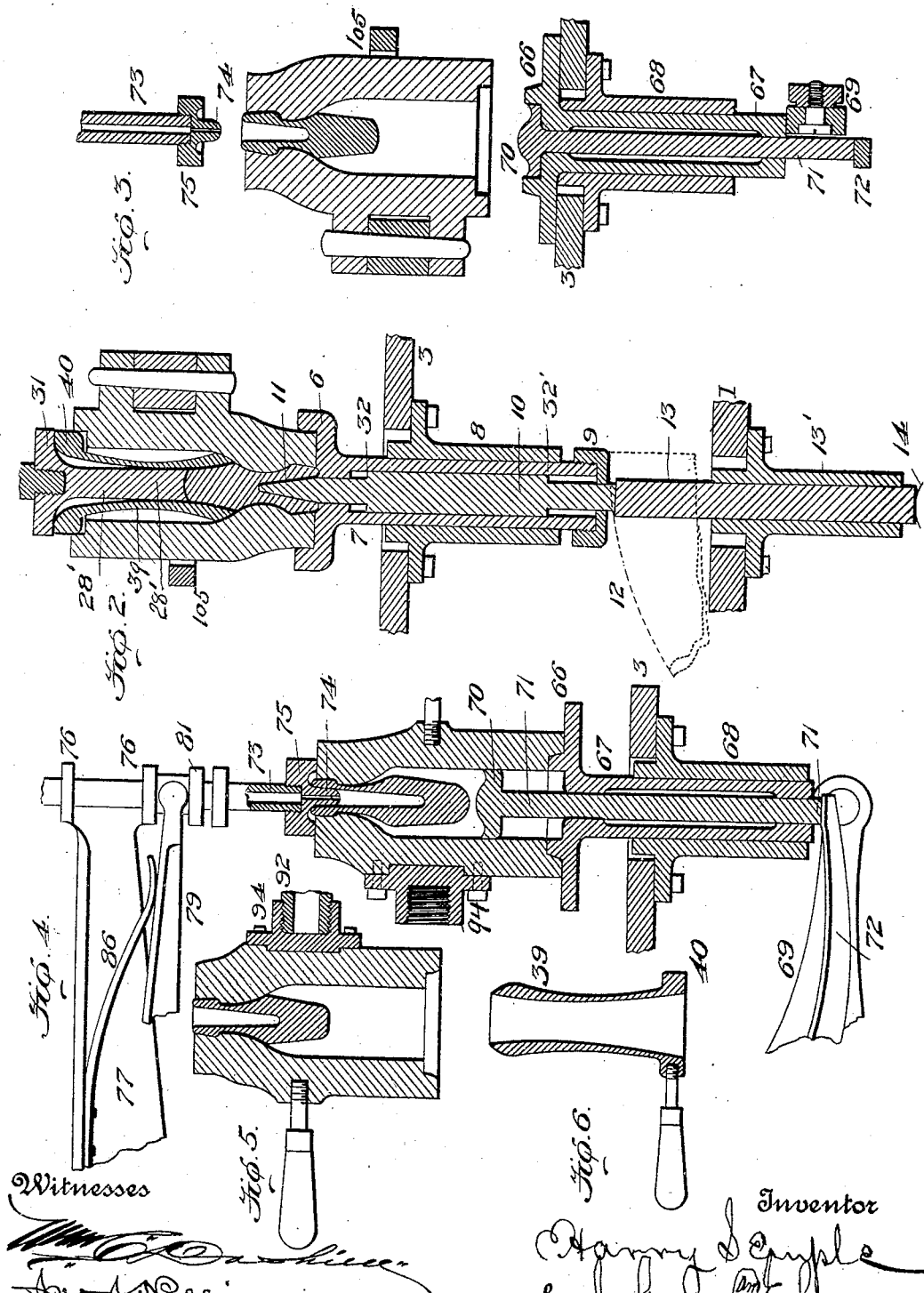

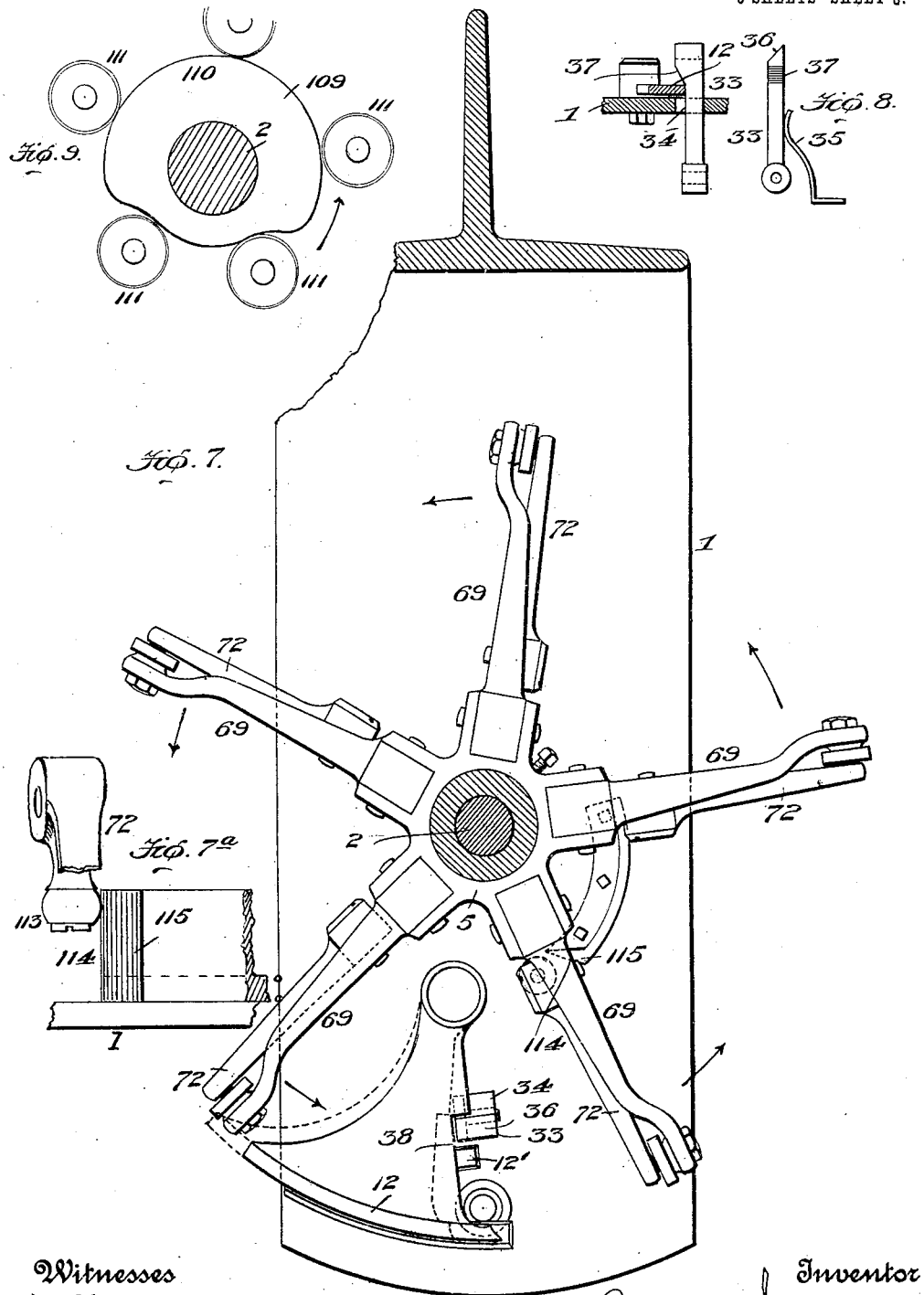

No. 808,874. PATENTED JAN. 2, 1906.
H. SEMPLE.
MACHINE FOR MAKING NECKED GLASS ARTICLES.
APPLICATION FILED AUG. 14, 1903.
6 SHEETS—SHEET 4.
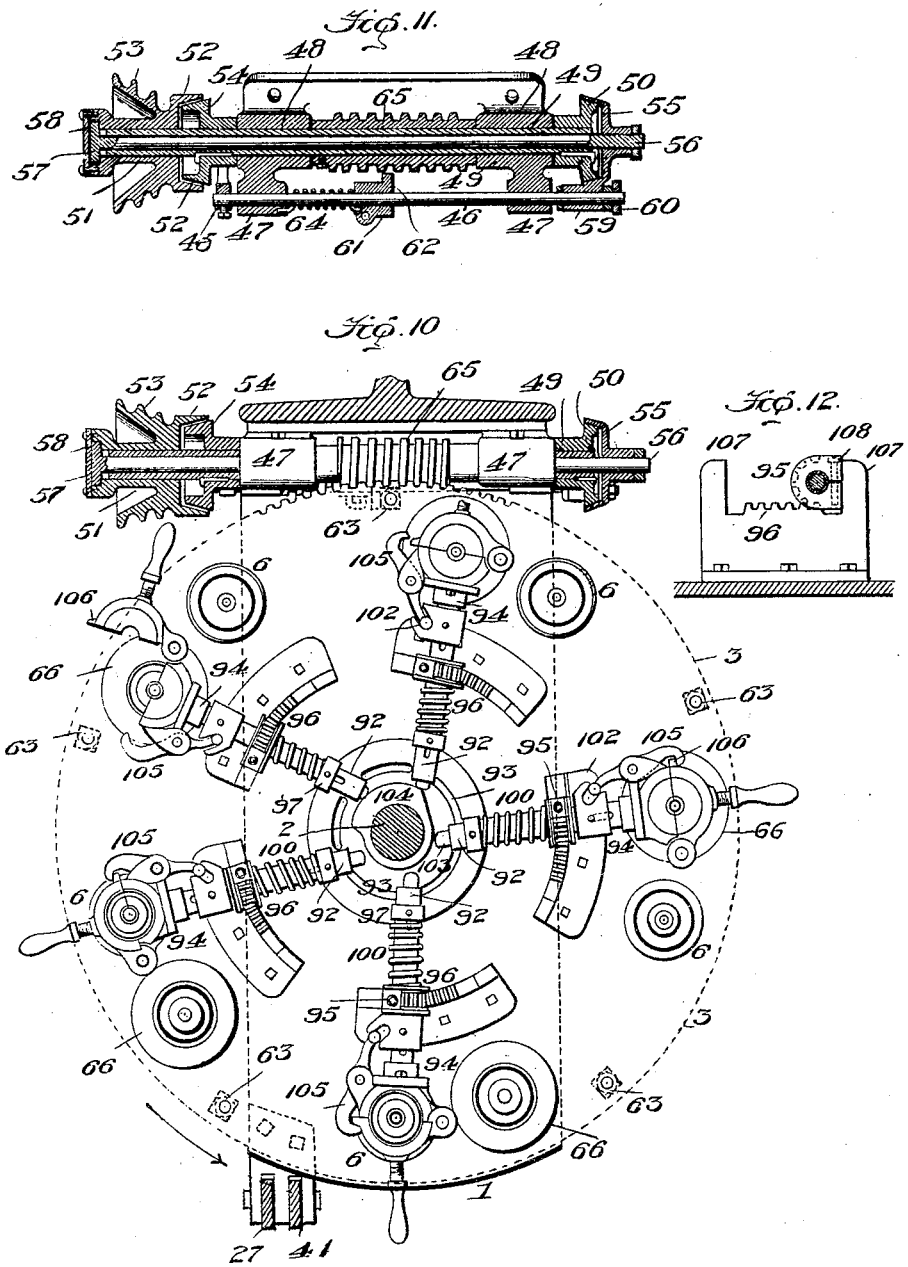

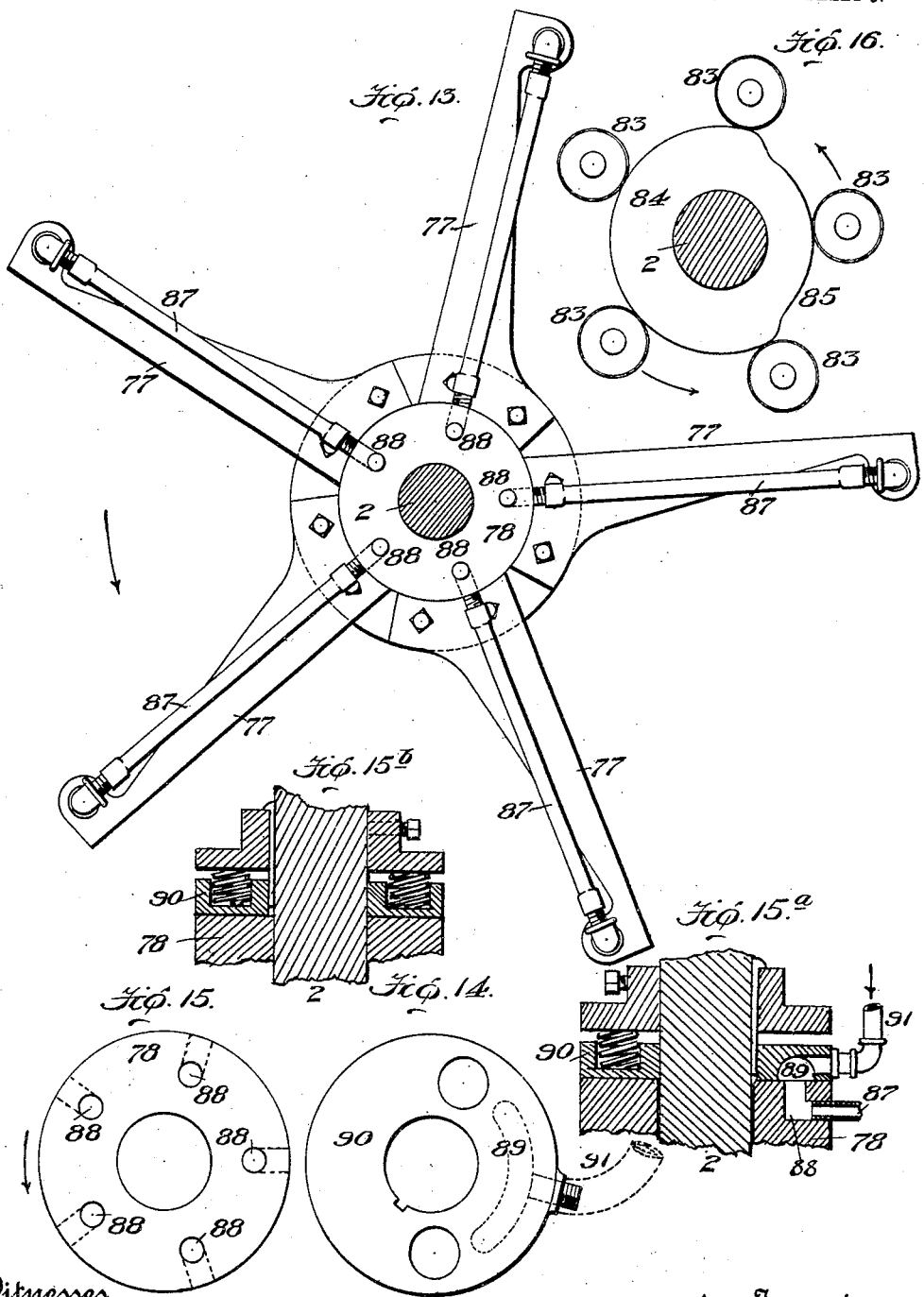

No. 808,874. PATENTED JAN. 2, 1906.
H. SEMPLE.
MACHINE FOR MAKING NECKED GLASS ARTICLES.
APPLICATION FILED AUG. 14, 1903.
6 SHEETS—SHEET 6.
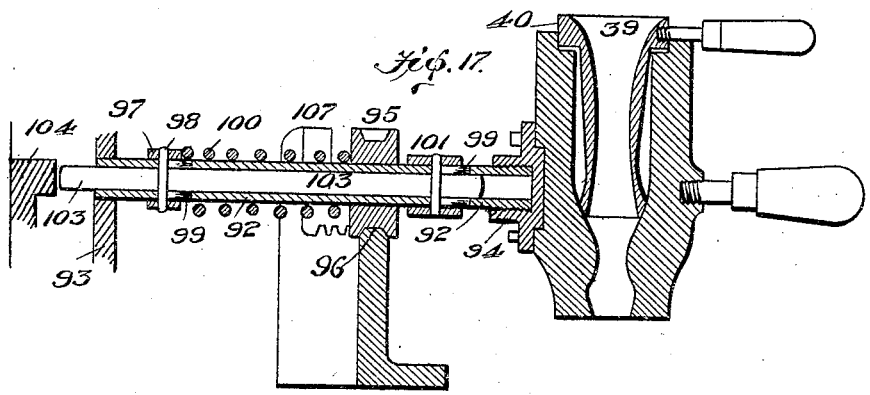
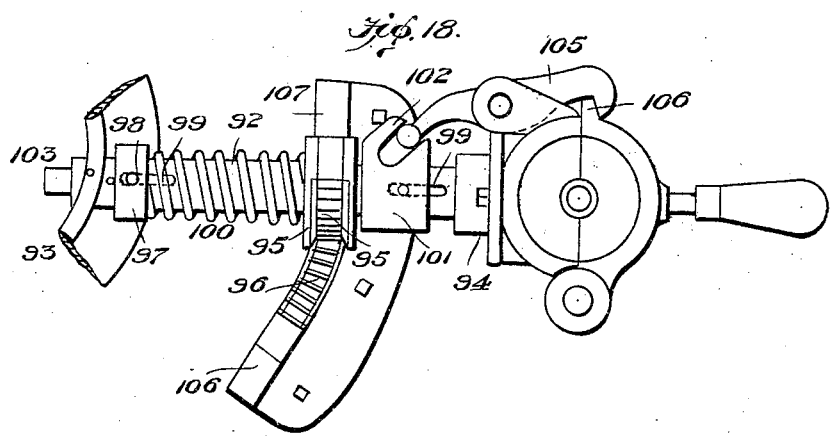
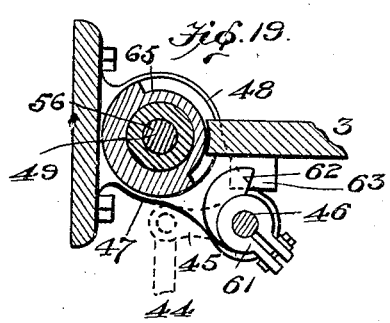
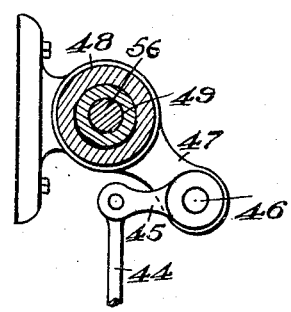

UNITED STATES PATENT OFFICE.

HARRY SEMPLE, OF WILMINGTON, DELAWARE.

MACHINE FOR MAKING NECKED GLASS ARTICLES.

No. 808,874.　　　Specification of Letters Patent.　　　Patented Jan. 2, 1906.

Application filed August 14, 1903. Serial No. 169,472.

*To all whom it may concern:*

Be it known that I, HARRY SEMPLE, a citizen of the United States of America, residing at the city of Wilmington, in the county of Newcastle and State of Delaware, have invented certain new and useful Improvements in Machines for Making Necked Glass Articles, of which the following is a specification.

The invention herein is directed to the production of an improved machine for the manufacture of necked glass articles and in which the article is made by the combined operations of pressing and blowing in the same mold, the pressing to form the neck, the initial blow-hole, and the blank and the blowing to shape and complete the blank into the finished article. In the pressing operation a shell-former is seated in the mold, with the neck-forming end of the latter standing down, and a plunger entering the shell from the top coöperates with a neck-forming plunger entering the bottom of the mold, while in the blowing operation the shell-former is removed and the mold is inverted and transferred from the seat-stand on which it was mounted during the pressing operation to an adjacent seat-stand, where the blowing operation takes place in conjoint coöperation with a bottom-forming plunger entering the mold from below and forming a bottom for the mold-chamber supporting and descending with the glass as it is being blown.

For effecting these separate and distinct operations my invention consists of certain parts and combinations of parts, which will be separately pointed out in the claims concluding this specification.

The following description read in connection with the accompanying drawings will enable any one skilled in the art to which my invention relates to understand its nature and to practice it in the form in which I prefer to employ it; but it will be understood that my invention is not limited to the precise form and details of construction herein illustrated and described, as various modifications and changes may be made without exceeding the scope of the claims in which my invention is set out.

So far as I know and can find I am the first to employ a shell-former removably seated in the mold and adapted for operation with an overhanging or upper plunger to form the blank for the article simultaneously with the formation of the neck and the initial blow-hole and in which the removal of the shell-former will leave the blank suspended free of the walls of the mold, and thereby render the expansion of the hanging blank more efficient and satisfactory under the blowing operation. Rapidity in the production of the articles, economy of labor in operating the machine, and the compactness of the operating parts are matters which contribute to the cheapness of the product.

Referring to the accompanying drawings, Figure 1 represents in vertical sectional elevation a machine for manufacturing necked glass articles embracing my invention, the operating parts at the right being in their relative positions when forming the blank for the article, the shell-former seated in the mold, the upper plunger ready to descend to close the shell-former, and the neck-forming plunger in its retracted normal position. Fig. 2 shows in vertical section the mold, its seat-forming stand, the shell-former, the upper plunger therein, and the lower plunger in its raised coöperative relation to the shell and to the upper plunger to form the blank within the shell and the neck and the blow-hole below the shell-former. Fig. 3 shows the mold in vertical section as having been swung over in inverted position on its mounting-shaft, the shell-former removed, the blow-nozzle in position to enter the blow-hole of the hanging blank, and the open bottom of the mold in position to receive the bottom-forming plunger and the mold-seat stand. Fig. 4 is a vertical section showing the mold, the plunger in position for shaping the bottom of the article and to descend with the glass while being blown, and the blow-nozzle in the position it occupies in blowing the blank upon the bottom-forming plunger. Fig. 5 shows in section the mold and the glass blank hanging therein as it is formed in the pressing operation. Fig. 6 shows the shell-former in section. Fig. 7 is a horizontal section taken below the table, showing the disposition of the cam-actuated levers, whereby the bottom-forming plunger for each mold is raised and held up during the blowing operation as the table rotates. In this view is shown the cam 12, by which the seat-stand 6 is raised, and a wedge device, Fig. 8, by which the cam is moved to one side to allow the stand to fall, carrying the neck-forming plunger 10 with it. Fig. 7ª shows the lifting-cam 114 for the lever 72 to elevate the plunger 70, as in Fig. 3. Fig. 8 shows details of this cam-shifting wedge device. Fig.

9 shows the fixed cam for lifting the levers 69, Fig. 7. Fig. 10 is a horizontal section taken above the table 3, showing the disposition of the molds and their mounting-shafts, the mold on the right having been inverted from the seat-stand 6 of the neck-forming plunger to the seat-stand 66 of the bottom-forming plunger in the blowing operation, and also showing the relation of the mold-carrying table to the clutch for controlling the intermittent rotation of the table. Fig. 11 shows in longitudinal section the clutch for automatically stopping the rotation of the table, whereby each mold in its turn is presented to receive the charge and for the successive operations of pressing and blowing. Fig. 12 shows in detail the segmental pinion and the fixed rack by which the mold is caused to be inverted on its mounting-shaft, as seen in Fig. 10, from the neck-forming seat-stand 6 to the adjacent seat-stand 66 for the blowing operation. Fig. 13 is a horizontal section showing the disposition of the arms which carry each a blow-nozzle and a rotating central valve member having ports by which each blow-nozzle has a hose air-supplying connection with said valve. Fig. 14 shows the upper fixed valve member and the segmental port with which each separate port of the rotating member registers as the table rotates. Fig. 15 shows in face view the rotating valve member which has the hose connection 87 for each blow device, Fig. 1. Fig. 15$^a$ shows in section the valve members of the air-ports and their hose connections. Fig. 15$^b$ shows the spring-pressed valve member of the air-ports. Fig. 16 shows the cam for operating the levers 79, which raise and lower the blow device. Fig. 17 shows in longitudinal section one of the molds as mounted upon a rotatable shaft and particularly showing the construction by which the mold-carrying shaft is caused to have a longitudinal movement and also the pinion 95 and rack for rotating the shaft. Fig. 18 is a top view of the same. Fig. 19 shows in cross-section the clutch worm-shaft 49, engaging the toothed edge of the table, and the shaft 46, which has the device for starting and stopping the rotation of the table by the engagement and disengagement of the trip projection 62 with the blocks 63, depending from the under side of the table. Fig. 20 is a cross-section showing the starting-lever connections with the trip-shaft of the clutch device.

For a table, say, five feet in diameter molds are disposed above it, but not upon it, equidistant near the circumference, the number being five, each mold being mounted upon a radial shaft supported and carried upon a central hollow shaft or sleeve rotatable with the table. Mold-seat stands are mounted on the table, a pair for each mold, so that when the neck of the bottle is being formed the mold will be supported on the seat-stand 6 in alinement with the neck-forming plunger which is carried by the mold-stand, as in Fig. 2. On the adjacent seat-stand 66 the same mold will be seated in the blowing operation, and vertically above these latter seat-stands are mounted blow-nozzles for operation with each mold when inverted, as in Fig. 4. Vertically above the neck-forming plungers are supported in overhanging relation vertical plungers for operation with a shell-former seated in the mold. All these parts are mounted to rotate together with the table, while upon the bed-plate are mounted lever devices for lifting the neck-forming plungers and the bottom-forming plunger in the pressing and in the blowing operations and for operating the overhanging plunger in the pressing operation. Upon a horizontal bed-plate 1 is fixed a central shaft 2, upon and around which the molds and their operating parts are disposed and carried. Above the bed-plate a table 3 is mounted to rotate freely upon the shaft and is supported upon ball-bearings seated in a hub 4, which is fixed to the shaft at its connection with the bed-plate, and for this purpose a sleeve extension 5 depends from the table, forms the traveling support therefor on the balls, and serves to support the table a suitable distance above the base for the arrangement beneath the table of mold-operating parts, to be presently described. Vertically-movable mold-seat stands 6 and 66 are disposed in pairs equidistant from the shaft near the circumference of the table, and a mold is mounted for operation with each pair of seat-stands, so that the molds will be one-fifth of the circumference apart to accord with the intermittent movement of the table in their operation with each pair of the seat-stands. These seat-stands I will separately describe, because the operation of each is for a separate purpose. The seat-stands 6 form cup-seats, Figs. 1 and 2, each having a sleeve or tube 7, which depends within a guide-sleeve 8, bolted to and depending from the under side of the table, and below this sleeve 8 the tube 7 extends and terminates, preferably, in a cap 9, screwed to the open end of the tube 7. Within this tube a plunger 10 is fitted for vertical movement, its lower end for this purpose extending through an opening in the cap to be acted upon by a lifting device to lift the plunger, the upper end 11 of which is tapered to form the initial blow-hole in the glass.

In Fig. 1 the mold-seating stand or tubular part 7 is seen in its elevated position and the neck-forming and blow-hole plunger 10 is in its lowest position of rest, and each has an independent vertical movement, the tubular seating part in advance of the plunger. For lifting the mold-stand seating part I provide a cam 12, Fig. 7, pivoted on and standing up edgewise from the plate 1, the cam-acting part rising from a lower to a higher plane, on which the sleeve-cap 9 rests, so that as the table is rotated the cam 12 engages the cup 9 and lifts and determines the extent of the lifting movement of the mold-supporting tubular part 6 and 7, while the cup-seat 6 limits the descent of the mold-supporting tubular part when at rest upon the table. It will therefore be seen that as the table is rotated the cap 9 of the mold-stand-supporting tube 7 will be engaged and elevated by the cam, Fig. 1, its highest part maintaining the mold-supporting parts raised while the neck and its blow-hole are being formed. For effecting the lifting of the blow-hole and neck-forming plunger a lifting-stem 13 is mounted for vertical movement in alinement with the plunger 10 by a sleeve 13′, fixed to and depending from the bed-plate, the lower end of said lifting-stem preferably freely resting on a roll 14 at the end of a beam 15, about mediately pivotally mounted in a hanger 16, depending from the bed-plate, and looking at Fig. 1 it is seen that this lifting-stem 13 is in its lowest non-acting position. The end of the beam 15 on which this stem rests is also in its lowest position and is supported by a hanger 15′, so that the cylinder, as shown in this figure, is at the limit of its ascent while the piston is at the limit of its descent, and the lower and upper plungers, which are actuated by the power-cylinder through their connected top and bottom levers, are seen as having been withdrawn from the mold. At the opposite end of the base is arranged in vertical position a cylinder 17, which is pivotally connected to the other end of the beam 15 and is provided with a piston 18, (seen in dotted lines,) and a piston-rod 19 passes through a stuffing-box 20 and is pivotally connected to a beam 21, which is pivoted about mediately of its length to an upward overhanging arm extension 22 of the base-plate. This piston is operated by compressed air or steam introduced through a pipe 23 and controlled by a slide-valve of any suitable construction, which works in a valve-chest 24, having an exhaust 24′, and is actuated by a bell-crank lever 25, pivoted at the base of the cylinder and operated by a rod 26, which extends horizontally beneath the bed-plate to the other end of the machine and is connected to and actuated by a hand-lever 27, pivotally mounted in the bed-plate. A stop 19′ on the upper overhanging frame-arm serves to limit the descent of the piston and that end of the lever 21 which connects the piston-rod. A weight 28 on that end of the beam 15 which operates the plunger 13 serves to overbalance the cylinder and hold it up while the piston is being forced up to operate the overhanging beam 21 to depress a plunger 28′, depending in guides from the overhanging end of the top pivoted beam. For guiding this top plunger the overhanging top frame part 22 is formed with a skeleton casting 29, while the overhanging end of the top pivoted beam is formed with a slot 30 to receive a roll to allow this end of the beam to describe an arc in vertically operating the plunger. Below the skeleton guide 29 this plunger has a collar 31, which serves to limit the descent of the plunger into the shell-former of the mold, as in Fig. 2. In this movement of the two plungers the cylinder and its piston have a movement relative to each other which is controlled by the hand-lever 27 and its connected piston-operating valve, so that, it will be seen, the upward movement of the piston will cause the descent of the plunger 28′ into the mold-shell until it is stopped by its collar, which thereby limits the upward movement of the piston. The pressure of the air in the cylinder against the piston will then cause the cylinder to descend and by tilting the lower beam force the neck-forming plunger up. When this neck-forming plunger is in its normal lowest position, as in Fig. 1, the cam 12 has raised the sleeve of mold-seat 6 and held it, and in this position the cam obstructs the descent of the cap 9 on the sleeve, and therefore the cam must be moved out of the way in order to let the sleeve drop to free its seat of the mold and to carry with it the plunger, and for this purpose the plunger has a shoulder 32, Fig. 2, upon which the upper end of the bore of the sleeve 7 strikes in its descent in case the plunger sticks in the glass and pulls the plunger out of the formed neck of the bottle, the descent of the plunger being limited by the shoulder 32′, resting on cap 9.

The provision whereby the cam is moved out of the way to allow the descent of the sleeve 7 consists of a latch 33, which, being pivoted to the plunger-operating end of the beam 15, stands up and is caused to be projected up through an opening 34 in the bed-plate, as in Figs. 7 and 8. In its normal position, as in Fig. 1, the upper end of the latch terminates in the opening and above the cam-plate 12 and is pressed against the wall of the opening by a spring 35, fixed on the beam and which constantly tends to force this end of the latch toward the wall of the opening. This end of the latch is beveled on two of its faces, one, 36, at right angles to the other, 37, as seen in Figs. 7 and 8, and the cam-plate is formed with a recess 38 on its edge, which in the normal position of the cam, as in Figs. 1 and 7, will allow the beveled end of the latch to stand in the opening against the edge of the cam-plate, with its bevel 37 next to the edge of the cam-plate, as in Fig. 8, while the other bevel 36 will stand toward the wall of the bed-plate opening. The latch or trip being pivoted so that its upper beveled end can only move toward and from the pivot of the cam and parallel with the recessed edge of the cam-plate, and its bevel 36, which stands toward the cam-pivot, will, by its contact with the wall of the bed-plate opening, be forced back from said wall as the latch is raised through said opening, as in Fig. 8. In this position the latch remains while the plunger 10 is forming the neck, and in this position the latch-bevel 37, which is next the edge of the cam-plate, has been carried up above said plate and the spring has forced the latch against the inner wall of the opening in the bed-plate. In this raised position of the latch the lower beam is also raised, and the neck-forming plunger having performed its function the beam is caused to fall and to pull down its connected latch, the bevel 37 of which will be thereby caused to engage the edge of the cam-plate and push or slide it away from the latch, whereby the cam part 12 is swung from its position supporting the sleeve 7 and out of the vertical path of the sleeve-cap 9 to allow it to fall to its normal position to repeat the operation. It will be understood that the pushing action of the latch-bevel 37 upon the cam-plate is effected by the spring which holds the latch in position during its pushing action upon the cam-plate, and which is thereby easily moved, the distance of such movement being comparatively little and its movement toward the latch is limited by a stop 12', Fig. 7, so that the cam-plate will not prevent the rising of the latch. The movement of the cam to bring it against the stop is caused by the cap 9 of the neck-forming plunger striking as the table rotates against the lowest part of the cam and the cam being thus moved against stop 12', after which the sleeve 7 is caused to rise, carrying the plunger with it. The blank is pressed in a shell-former 39, open at both ends, its inner end properly fitting upon the walls of the mold, while its outer end terminates in an external shouldered head 40, fitted into a recess in the open end of the mold to properly seat and suspend the shell-former in the mold. As shown, the inner walls of the shell-former are shaped to give form to the blank which is to form the body of a bottle and flares outward therefrom to render it easy to drop the glass down into the neck-forming part of the mold and to allow the upper plunger 28' to enter freely and pass into the former until arrested by the striking of the plunger-shoulder 31 upon the end of the former to hold it firmly in the mold. At its inner end the inner walls of the shell-former flare to allow it to be easily withdrawn from the formed body of the blank, and thereby prevent misshaping it. The plunger also forms a back support for the glass when under the upward pressure of the lower plunger, so that the coacting functions of the two plungers complete the forming of the necked blank within the mold, and in this operation the upper plunger remains stationary while the lower plunger is doing the pressing. After this pressing operation the shell-former is withdrawn from the mold and leaves the formed blank with its body part free of the walls of the mold, as seen in Figs. 3 and 5, and which under the blowing operation is free to be uniformly spread by the air-pressure. A feature of importance in this shell-former is that it only has contact with the walls of the mold at its ends, and the inner end of the former being of the least diameter it can be placed within and withdrawn from the mold without injury to its walls, upon which the blank as it hangs in the mold is to be blown.

I have stated that the rotation of the table is intermittent, and it will be understood that at the time the shell-former is removed from the mold the table has no movement and that immediately following the removal of the shell-former the mold is moved to invert it to the position for the blowing operation. The rotation of the table is effected and controlled by a clutch which is controlled by the hand-lever 41, which is pivoted to the base-plate adjacent to the hand-lever 27, which controls the pressing-plungers. A rod 42 connects the hand-lever 41 and extends to and connects a bell-crank lever 43, pivoted on the base-plate and which by a link 44 connects with a crank-arm 45, Figs. 1, 19, and 20, which is fixed upon the end of a shaft 46, which is mounted in bearings 47, formed in a casting fixed to and projecting from a standard which terminates in the overhanging frame-arm. This rod or shaft 46 forms the tripping element of a clutch which controls the rotation of the table and is arranged in tangential relation to the circumference of the table. Parallel with this trip-rod and mounted in bearings 48, Fig. 11, in the same casting are the parts which constitute the clutch and which consist of a tubular shaft 49, one end of which has a fixed conical hub 50, while on its other end is mounted a sleeve 51, which on its inner end has a hollow conical clutch member 52 and carries the power-driven pulley 53, which runs freely on the tubular shaft. Keyed on the tubular shaft is a conical hub 54, which engages the clutch member 52 of the power-driven pulley, and it is by the engagement of these clutch members that the tubular shaft is rotated, while the conical hub 50 at its other end engages a corresponding conical clutch member 55, screwed on the projecting end of a shaft 56, extending through the tubular shaft, and is fastened to it by a collar 57 and cap 58, whereby the power-driven sleeve and its connected shaft 56 may be moved together endwise. The clutch member 55 on the projecting end of the central shaft has a tubular extension 59, fastened by means of jam-nuts 60 on the end of the trip-shaft 46, so that longitudinal movement of the trip-shaft will engage or disengage the clutch member 55 with the clutch member 50 of the tubular shaft, while the same movement of the trip-shaft will engage or disengage the clutch member 52 of the power-driven pulley. For controlling these clutch movements a collar 61 is clamped on the trip-shaft so as to be adjusted thereon and has an extension 62, Fig. 19, which stands in the path of small blocks 63, Figs. 1 and 10, fixed on the under side of the table, there being one such block between the mold-seat stands 6 and 66, as seen by dotted lines in Fig. 10. A spring 64 on the trip-shaft acts against the collar 61 to constantly press the clutch member 55, fixed on the center shaft, out of engagement with the clutch member 50 of the tubular shaft. At the same time and by the same movement of the trip-shaft the clutch member 52 of the power-driven pulley is brought into engagement with the clutch member 54, fixed on the tubular shaft, which drives the worm 65, which is keyed on the tubular shaft between the bearings therefor. The trip-rod 46 is rocked in its bearings to cause the trip-collar 61 to be moved into and out of the path of the trip-blocks, and when said collar stands in the path of the blocks the latter are the means for effecting the disengagement of the power-driven pulley and at the same time effect the engagement of the clutch member 50 of the tubular shaft with the clutch member 55 of the center shaft, and this engagement causes this clutch member 55 to act as a brake to stop the rotation of the table at a point where it brings the mold in vertical alinement with the pressing-plungers. For this purpose the end of the trip-rod turns freely in the clutch member 55, and as the table carries a block in contact with the trip-collar, which is fast on the rod, the collar, with the rod, is thereby moved longitudinally to the left, releasing the power-driven pulley and bringing the clutch member 55 in contact with the clutch member 50, stopping the worm and the rotation of the table, for it is seen that the clutch member 55 is prevented from turning upon its shaft 56 by its connection with the trip-shaft sleeve-bearing 60 of the trip-rod. In stopping the rotation of the table the operation of the machine is also stopped, leaving the trip-collar in engagement with the table-block, as in Fig. 19. The trip-collar is held up in this position by the torsional action of the spring 64 on the rod, and this spring also constantly exerts its force to drive the trip-rod to the right. Therefore to start the machine and the table the lever 41 is pushed inward and by its rod connections pulls the trip-collar down and out of the path of the table-blocks, thereby allowing the spring to force the trip-rod to the right, looking at Fig. 10, releasing the clutch member 50 and engaging the pulley-driven clutch member with the clutch member 54 of the tubular shaft, setting the worm in motion. On releasing the hand-lever it will be returned to its normal position by the torsional force of the spring, which for this purpose is strong and is wound tightly upon the rod. In this way the table is intermittently rotated and presents each mold in succession to receive the action of the pressing-plungers. In this position the table stands during the pressing operation and the inverting of the mold, when the table is again started by pushing the hand-lever 41 inward, which by its connections with the arm 45 of the trip-shaft causes the latter to be rotated, and with it the trip-collar 62, to put it out of the path of the table-block 63.

Near each of the pressing-mold stands is fitted in the table a vertically-movable seat-stand 66, Fig. 3, from which a sleeve or tube 67 depends within a guide-sleeve 68, bolted to and depending from the under side of the table, and below this sleeve 68 the tube 67 depends to be acted upon by a lifting-lever 69, pivotally mounted between the table and the base, for a purpose I will presently state. A plunger 70 is caused to operate like a piston within the open bottom of the mold and is shaped to form the bottom of the article as it is being blown down upon the forming-face of the plunger. The stem 71 of this plunger former extends below the end of the tube 67 to be lifted by a lever 72, pivotally mounted between the table and the base, to operate in a way which I will presently state to support the bottle while being blown.

The neck, the blow-hole, and the body of the bottle having been formed as seen in Fig. 2, the mold by a horizontal turning of its support is caused to be turned or lifted from the position in which the neck is formed and inverted centrally over the stand 66 to bring the neck-forming part of the mold upward to allow the blowing device to be applied to the blow-hole, as in Fig. 3. The blowing device consists of a vertical tube 73, which terminates in a blow-nozzle 74, preferably formed on a cap 75, which is screwed upon the tube and in the blowing operation is seated upon and closes the neck-forming end of the mold, as in Fig. 4. The blow-tube 73 is mounted for vertical movement in guides 76 on the end of an arm 77, which is fixed on and extends from a casting 78, which is mounted to rotate with the table upon the fixed shaft. A lever 79 is pivotally mounted at 80 on the horizontal arm 77, and the long arm of this lever engages a collar 81, fixed on the blow-tube, while the short arm 82 of this lever stands down and is provided with a roll 83, Figs. 1 and 16, arranged to engage a horizontal cam 84, fixed on the fixed center shaft and adapted to elevate the long arm of the lever 79 by the rotation of the table which carries the casting 78, Figs. 13 and 15, and thereby raise the blow-tube from and support it free of the mold when not blowing, as in Fig. 1. In Fig. 4 the blow-tube is shown in its blowing relation to the mold, and it will be undersood that when that part 85 of the cam, Fig. 16, engages the lever-roll 83 the blow device will be free to fall with its connected lever-arm 79 to place its blow-nozzle within the neck-forming end of the mold, and in this position the blow-nozzle cap 75 is held firmly within the neck-forming end of the mold by a spring 86, fixed to the arm 77, which carries the blow device and bears upon the lever 79, which elevates the blow device free of the mold. A hose 87, Figs. 1 and 13, connects the upper end of the blow-tube with a port 88, Fig. 15, formed in a hub 78 of the casting which carries the blow-tube-supporting arm, and this port opens at the top of the hub and registers with a port 89, Fig. 14, formed on the under side of a ring plate 90, fixed to the shaft, so that a hose 91, Figs. 14 and 15ª, which connects with the port 89, also connects with a reservoir, (not shown,) whereby compressed air is supplied to the blow-tube for blowing the bottle.

Each mold is fixed on the end of a horizontal steel tube or sleeve 92, whose inner end is supported in a ring casting 93, bolted to the table. This ring casting forms the bearing for the inner end of each tube or sleeve, and such bearing is made loose to give freedom for the lateral movement of the mold-carrying end of the tube in the operation of inverting the mold. A convenient way of mounting the mold is seen in Figs. 1 and 17, in which a ring socket 94, bolted to the side of the mold, receives the screw-threaded end of the sleeve 92, so that the latter is caused to rotate with the inversion of the mold. Fixed upon this sleeve near its mold-connected end is a half-gear pinion 95, Fig. 12, which rests upon and engages a horizontal segmental rack 96, fixed upon and rising from the table. Near its inner end the sleeve is provided with a collar 97, which by a pin 98 and slot 99 connection with the sleeve is free to have a sliding movement thereon. Between the collar 97 and the face of the gear a coil-spring 100 is fitted on the sleeve to constantly force the collar inward. Between the half-gear and the mold and on the sleeve 92 is a collar 101, which is formed with a slotted projection 102, Fig. 18, at one side. Within the sleeve is a rod 103, to which both collars are pinned through slots 99 99 in the sleeve, as seen in Figs. 17 and 18, and the inner end of the rod 103 projects beyond the end of the sleeve to coact with a cam 104, Figs. 1 and 10, fixed on the center fixed shaft, which cam as the table rotates acts on the end of the rod 103 and drives it outward, the slots 99 in the sleeve allowing the longitudinal movement of the rod. On one half of the mold is pivoted a horizontal catch 105, Figs. 10 and 18, one end of which is adapted to engage the slot in the collar 101, the other end of the catch being adapted to engage a lug 106 on the other half of the mold, so that when the cam part 104 of greatest projection is pushing the rod outward the latter thereby forces its connected slotted collar 102 in the same direction, thereby forcing the inner end of the catch back in the slot and causing the disengagement of the catch with the mold-lug, leaving the mold free to be opened by its handle. To produce this unlocking action of the catch, the collar-slot stands inclining outward from the collar toward the mold. When during the rotation of the table the part of least projection of the cam 104 has no action upon the rod, the spring forces it, together with the sleeve, inward, and, the mold having been previously closed, thereby causes the slot in the collar to actuate the catch to put it in engagement with the mold-lug to fasten the mold, as shown in Fig. 18. In Fig. 10 I have shown a plurality of molds arranged concentrically with the shaft 2 all of identical construction and operation, so that the cam 104, fixed upon the shaft, will cause the molds to be locked and unlocked in succession during the rotation of the table.

In the operation of removing the mold from the position in which to coact with the upper and lower plungers to form the neck and body of the bottle to the position in which the mold is inverted upon the seat-stand 66 for the blowing operation it will be observed that the mold is rotated through an arc of a half-circle—that is, to reverse the mold from its inverted position on one seat-stand, as in Fig. 2, to bring the neck upward on an adjacent seat-stand, as in Fig. 4, it is necessary to provide a stop to limit the inverting movement of the mold. For this purpose the rack is provided with an abutment 107, and as the swing of the mold must be limited to an arc of a half-circle the half-gear pinion 95 will also in its rotation be limited to a half-circle, and therefore is formed with a flattened part 108, Fig. 12, on that side of its shaft opposite the cogged part, so that this flattened part will be caused to strike against the abutment 107 of the rack and stop the turning of the pinion the moment the mold in its inverting movement reaches a vertical position.

Referring to Fig. 4, it will be noted that by the action of the cam 109, Figs. 1 and 9, fixed on the fixed center shaft, the lever 69 has been lifted by that part 110 of the cam of greatest diameter to raise the mold-stand 66 to close and to form the bottom of the mold and is held in such position during the blowing operation by the engagement of the lever-rolls 111 with said cam. For this purpose the lever 69 has a short arm 112 depending from its pivoted end, so that the roll thereon engages the cam and holds the lever up, as stated. Immediately after the stand 66 has been raised a roll 113, Fig. 7ª, on a short arm depending from the lever 72 near its pivot is caused to engage a cam 114, fixed on the base, to raise the stem 71, and thereby carry its bottom-forming plunger 70 into the mold to meet the body of the glass and support it while being blown. For this purpose the cam shown in Fig. 7 is so formed as to cause the lever 72 to rise suddenly until it meets the portion 115 of the cam the greatest distance from the shaft, when the lever is caused to gradually descend as the roll 113 travels around and in contact with the outer wall of the cam, and which outer wall gradually approaches the shaft, and thereby allows the bottom-forming plunger to descend with the falling movement of the lever 72.

In operating the machine the following movements and steps take place in producing a bottle. The power-cylinder 17 being supported in its elevated position upon the bottom beam 15, as in Fig. 1, is ready to be forced down, and, the mold being in position bottom upward on its seat-stand 6, the shell-former 39 placed in the mold, and a charge of glass is dropped into the shell-former. The valve-connected lever 27 is pulled out to open the valve in the valve-chest to admit compressed air beneath the piston and force it up, which by its piston-rod 19 actuates the top beam 21 to force the upper plunger 28' down into the shell-former until its descent is arrested by the collar 31 of the plunger striking upon the top of the shell-former. In the meantime the piston 18 has reached the limit of its ascent, and, being held at that limit, the pressure within the cylinder acting upon the lower head of the cylinder will force it down, thereby actuating the lower beam 15 to drive up the plunger 10 to form the neck and the blow-hole of the bottle and at the same time force the glass up into the shell-former against the upper plunger 28' to form the body of the bottle, as in Fig. 2. The beam in thus raising the plunger 10 also raises the latch or trip 33 to project its beveled end 36 up through the opening in the table for a purpose which I will presently state. At this point the lever 27 is pushed inward and by its valve-rod connections 25 admits the compressed air to the upper side of the piston, which being held stationary forces the cylinder up, aided by the weight 28 on the lower beam. The cylinder having reached the limit of its ascent, then the piston starts to descend and by its piston-rod connections pulls the upper plunger 28' out of the shell-former. The next step is to move the cam 12 from under the cap 9 of the sleeve 7 of the neck-forming plunger 10 to give a free way for the falling of the sleeve and its plunger. That end of the lower beam which raises this plunger 10 having fallen, has pulled down the latch or trip 33, and in the fall of the latter its beveled projection 37, strikes against the edge of the cam-plate 12, and the latter swinging on its pivot moves the cam to one side out of the path of the sleeve-cap 9, as shown by dotted lines in Fig. 7, to allow it to descend, carrying the plunger 10 with it, and for this purpose the neck-forming part of the plunger is reduced, forming a shoulder 32, on which the sleeve-seat 6 strikes in its descent to pull the plunger from the neck. It will be understood that the dropping of the sleeve is caused by its weight when the cam 12 is moved out of its path. The descent of the sleeve-seat 6 leaves the mold free to be reversed to bring its neck part up by turning it through a half-circle on its supporting-shaft. In this position the shell-former is withdrawn from the mold, leaving the body of the bottle free of the walls of the mold, which gives a better effect in blowing the body of the bottle. This reversing of the mold is effected by pushing it by hand sidewise, thereby causing the half-pinion 95 on its supporting-shaft to be revolved by its engagement with the rack 96, which supports the shaft. This sidewise rolling movement is limited by the form of the uncogged flattened side 108 of the pinion rolling against the abutment 107 on the rack 96, which brings the mold in alinement with a seat plate or stand which forms the bottom of the mold when inverted. This reversing of the mold also places it in alinement with the blowing device, and in this relation to the blowing device the mold stands open at both ends, as in Fig. 3, and in this position it is caused to be closed at its bottom and to receive the blow device at its top by means actuated by the rotation of the table. The table is now caused to be rotated by pushing in the lever 41, which by its connection with the clutch sets the table in operation, and as the table rotates the cam 109 at the base of the fixed shaft acts to lift the free end of the lever 69, and with it the sleeve 67, the top seat-stand 66 of which forms the bottom of the mold, and is held in that position to support the mold. At the moment the bottom stand strikes the mold the supplemental lever 72 by its cam 109 is caused to be raised to carry the stem 71 and its plunger 70 up into the mold to form the bottom of the bottle. When the plunger reaches the limit of its ascent, the blow device is caused by its weight and that of the cam-connected lever 79 to descend and insert its blow-nozzle 74 into the neck of the bottle and by its collar 75 resting on the mold and is held in that position by the spring 86 while the bottle is being blown. The air is now admitted to the blow-tube by the inlet-air-segment port 89 of the fixed disk registering with the port 88 in the head-casting 78 as the table rotates, and at the commencement of the blowing the bottle-supporting plunger 70 commences to desend while supporting the bottom of the bottle as it is being blown. The rotation of the table to this point occupies one-fifth of its circle and brings the table to the stopping-point, where the same steps of the operation are commenced in a succeeding mold and during the repetition of these steps the air remains under pressure in the blown bottle and is cut off at the end of the second step in the rotation of the table, for it will be understood that the rotation of the table is intermittent, moving a fifth of a circle each time. At the point at which the air is cut off the blow-tube 73 commences to rise and is held in its lifted position by its cam 84 until it comes to its turn for repeating the operation in the same mold as the table rotates. As the table rotates and reaches its third stop the mold is automatically unlocked by the fixed cam 104 acting on the rod 103, which by its slotted collar 102 acts to disengage the catch 105 from its engagement with the mold and leaves it free to be opened for the removal of the bottle. After the bottle is removed the mold is closed by hand, and the table continuing to rotate brings the latch-actuating rod 103 in engagement with the part of the cam of least projection, and the spring 100, forcing the rod 103 and its slotted collar 102 inward, causes the latch 105 to be again engaged with and to lock the closed mold. The continued rotation of the table to its fourth stop will by the fixed cam 108 cause the bottom stand 66 to descend, and thereby leave the mold free to be turned over on the mold-stand 6 to again bring the bottom of the mold up for the succeeding operation, which commences at the starting-point, in which the mold receives again the shell-former and the charge.

I have stated that the table is rotated intermittently in completing a circle of five stops, and it will be understood that each succeeding stop is made by the disengagement of the clutch by means 63 on the table at each stop, while the lever 44 operates the clutch to move the table.

I have stated that the spring 100 is to constantly force the rod 103 inward, and, referring to Fig. 18, it will be seen that this function of the spring is to keep the rod under tension, and thereby keep the mold securely locked by reason of forcing the slotted collar 101 inward, and which by the action of the slot upon the end of the latch 105 forces its slot-engaged end outward and the other end of the latch inward, binding it hard upon the inclined face of the lug 106. When the mold has rotated and reached a point to be opened, the rod is forced inward by means of the cam 104, thereby carrying the collar 101 with it and releasing the latch.

It is important to note that in forming the blank the upper plunger has no pressing function, but serves to hold the shell-former in place, to close the end of the mold, and to form a resistance to the glass in the pressing operation, and for this purpose the shoulder 31 limits the descent of the plunger. The shoulder 40 of the shell fits in an annular recess in the bottom of the mold to hold it true, and it is an important feature of novelty in the function of the shell-former that it flares at both ends; and coöperates with a plunger shorter than the shell-former to prevent the plunger passing down into the flaring end of the shell-former and sticking to and misshaping the end of the blank.

In Fig. 10 the hinged section of one of the molds is shown opened, while in Fig. 18 the mold is shown as closed and locked by the action of the cam.

It will be noted that the mold stand or support 66 is formed with a projection concentric with its bore and that the bottom of the mold is formed with a corresponding recess which when the mold is seated fits over and forms a close joint for the mold on the stand in the blowing operation, while the mold-stand 6 forms a cap or rimmed seat within which the neck end of the mold is seated and closed in the operation of forming the blank. The mold and the blank-forming shell or tube are provided with handles.

The matrix of the mold conforms to the shape of the body and neck of the completed article, whether it be a bottle or a jar, and the shell or tube will be adapted, with the neck-forming portion of the mold-matrix, to form the blank.

The segmental port is of a length to cause the air to be blown into the article until the table has rotated one-fifth of a revolution beyond the first point of blowing, and thereby gives plenty of time to cause the glass to conform exactly to the walls of the mold-matrix and renders the walls of the article of uniform thickness.

I claim—

1. In a machine for making hollow glass articles including a mold, a shell-former having its inner walls flaring at each end, its outer end having a shoulder overhanging and closing the open bottom of the mold for the purpose stated.

2. In a machine of the character specified, and in combination with a mold, a shell-former having its inner walls flaring at each end, its outer end having a shoulder overhanging and closing the open bottom of the mold, and a plunger adapted to operate within and to close the upper flaring end of the shell-former in forming the body of the blank.

3. In a machine of the character specified, and in combination with a mold, a shell-former having its inner walls flaring at each end, its outer end having a shoulder overhanging and closing the open bottom of the mold, and a plunger adapted to operate within the flaring end of the shell-former and having a shoulder overhanging and closing the open flaring end of the shell-former.

4. In a machine of the character specified, and in combination with the mold, a shell-former or tube open at both ends, its inner end freely fitted upon the inner walls at the neck of the mold, its outer end flaring and having a shoulder closing the open bottom end of the mold.

5. In a machine of the character specified, and in combination with a mold open at both ends, a shell-former open at both ends and insertible within the open bottom of the mold, an upper plunger of less length than the shell-former adapted to operate in it in pressing the body of the blank, means automatically to insert and withdraw said plunger, an under plunger adapted to operate below the shell in forming the neck and blow-hole of the blank, and means automatically to insert said plunger into the mold.

6. In a machine of the character specified, and in combination with a mold open at both ends, a removable shell-former or tube open at both ends and adapted to fit upon the neck-walls of the mold, the outer end of the shell-former flaring and having a shoulder closing the open bottom of the mold, an upper plunger adapted to operate within the shell-former and having a shoulder abutting the shoulder of the shell-former to confine the latter and limit the insertion of the plunger, a seat stand or support adapted to close the neck end of the mold, a plunger adapted to operate within the neck end of the mold, means automatically to insert the upper plunger into and withdraw it from the shell-former, means automatically to raise and lower the seat-stand in its relation to the neck end of the mold and means automatically to insert the neck-forming plunger into the mold.

7. In a machine of the character specified, and in combination with a mold, a sleeve having a seat-stand adapted to close the neck-forming end of the mold, a lower plunger adapted to operate within the open neck of the mold, means automatically to raise and lower the seat-stand, means automatically to insert the plunger into the mold, means on the seat-forming stand and means provided on the plunger whereby the latter is withdrawn from the mold and means provided on the plunger and on the sleeve to limit the descent of the plunger from the mold.

8. In a machine of the character specified, and in combination with a mold open at both ends, a removable shell-former or tube open at both ends and adapted to fit upon the neck-walls of the mold-chamber, an upper plunger adapted to operate on the glass within the shell-former, a lever suspending and operating said plunger, a vertically-movable power-cylinder and a piston therein connected with said lever, and a power-supplying pipe connected to said cylinder, an under plunger adapted to operate within the open neck of the mold, a lifting-stem for said under plunger, a lever mounted beneath the base connected to said lifting-stem and to the lower end of power-cylinder, a hand-lever mounted on the base and a rod connecting said hand-lever with the valve connections of the power-cylinder.

9. In a machine for making necked glass articles, an open-ended mold the matrix of which conforms to the shape of the body and neck of the completed articles a shell or tube removably insertible in the mold and adapted with the neck-forming portion of the mold-matrix to form the blank, a plunger removably insertible in the mold to form the blow-hole, a bottom-forming plunger insertible in the mold upon the withdrawal of the tube to form the bottom of the article, and blowing means for completing the article.

10. In a machine for making necked glass articles, an invertible mold, blank-forming means comprised of a shell or tube insertible through one end of the mold and a blow-hole-forming plunger insertible through the opposite end of the mold, and blowing means operating upon the inversion of the mold to complete the article.

11. In a machine for making necked glass articles, an invertible open-ended mold, a shell-former in the mold and a plunger in the shell-former and of less length both at one end of the mold in one position of the latter, a lower blow-hole-forming plunger operating in the neck end of the mold below the shell-former to form the blank and blowing means operating to complete the article upon the removal of said shell and upper plunger and the inversion of the mold.

12. In a machine for making necked glass articles, an invertible open-ended mold, devices insertible through opposite ends of the mold in one position of the latter to form a blow-hole-containing blank, and a blowing device and a bottom-forming device insertible respectively through opposite ends of the mold after its inversion and the removal of the blank-forming devices.

13. In a machine for making necked glass articles, an invertible open-ended mold, a blank-forming tube and a blow-hole-forming plunger insertible respectively through opposite ends of the mold in one position of the latter, and means for finishing the article upon the inversion of the mold and the removal of the tube and plunger.

14. In a machine for making necked glass articles, an invertible open-ended mold, a blank-forming shell or tube and a blow-hole-forming plunger insertible respectively through opposite ends of the mold in one position of the latter, and a blowing device and a bottom-forming plunger insertible respectively through opposite ends of the mold after its inversion and the removal of the shell or tube and plunger.

15. In a machine for making necked glass articles, an open-ended mold, devices removably insertible in the mold for forming a blow-hole-containing blank, a blow-tube adapted to enter the blow-hole of the blank, and a bottom-forming plunger movable in the mold as the blowing progresses, said blow-tube and plunger being insertible upon the withdrawal of the blank-forming devices.

16. In a machine for making necked glass articles, an open-ended mold, an apertured support for the mold, a blow-hole-forming plunger movable through said support-aperture to enter one end of the mold, a shell or tube insertible through the opposite end of the mold, and an upper plunger insertible in the tube, said parts coacting to form a blow-hole-containing blank.

17. In a machine for making necked glass articles, an invertible open-ended mold, devices removably insertible in the mold in one position of the latter for forming a blow-hole-containing blank, means for inverting the blank-containing mold, an apertured stand for supporting the inverted mold, a bottom-forming plunger movable in the stand-aperture to enter the mold, and a blow-tube insertible through the opposite end of the mold.

18. In a machine for making necked glass articles, an open-ended mold, an apertured support for the mold, a blow-hole-forming plunger movable through said support-aperture to enter one end of the mold, a blank-forming shell or tube insertible through the opposite end of the mold, a second apertured stand, means actuated by hand for inverting and carrying the blank-containing mold after the removal of the tube and plunger to the second stand, a bottom-forming plunger movable in the second stand-aperture to enter the mold, and a blow-tube insertible through the opposite end of the mold.

19. In a machine for making necked glass articles, the combination of a mold and means for forming a blow-hole-containing blank, including a vertically-movable seat-stand and a vertically-movable plunger, a blow-tube, and means for moving the blow-tube nozzle to and from the blank, including a bell-crank lever and a cam for actuating the lever and a table rotatively carrying the mold and the blow-tube.

20. In a machine for making hollow glass articles, the combination of rotatable means including a mold, for forming a blow-hole-containing blank, a blow-tube, and means for moving the blow-tube to and from the mold comprised of a fixed cam centrally located in its relation to said rotating means, a bell-crank lever between the cam and blow-tube for raising the latter from the mold and rotating with said means and a spring for holding the blow-tube firmly within the neck-forming end of the mold.

21. In a machine for making glass articles, the combination of a mold, a pair of vertically-movable seat-stands side by side on one of which the mold is seated in an inverted position during the forming of the blank for the article, the other seat-stand supporting the mold during the operation by which the article is finished by blowing, and means by which the mold is changed from one seat-stand to the other.

22. In a machine for making glass articles, the combination of a mold, a seat-stand therefor, means coacting with both ends of the mold and the said seat-stand for pressing the blank therein, a second mold seat-stand, means by which the mold is changed by inversion from one support to the other, and blowing means for completing the article on the second seat-stand.

23. In a machine for making glass articles, the combination of a mold, a pair of vertically-movable seat-stands, means for pressing in the mold on one of said seat-stands a blow-hole-containing blank, means for imparting to the mold a swinging movement to invert it from one seat-stand to the other and means for blowing the article in the inverted mold.

24. In a machine of the character described, the combination of a mold, a hollow shaft fixed to the side of and carrying said mold, a fixed bearing-support for the inner end of the hollow shaft, a pinion fixed on the hollow shaft between its fixed end bearing and the mold, a fixed rack for the pinion supporting the hollow shaft, the latter having a swinging movement in its fixed end bearing, stops at each end of the rack limiting the swinging movement of the shaft, and a pair of seat-stands coöperating with the mold in the separate operations of press-forming and blowing the article.

25. In a machine of the character described the combination of a mold of two hinged sections, a hollow shaft fixed on the side of one of said mold-sections, a fixed bearing-support for said shaft, means for rotating said shaft, a lock for said mold-sections, and means operating longitudinally within said shaft to effect the release of the lock.

26. In a machine for making glass articles, the combination of a mold, a vertically-movable support for said mold, means for forming in the mold a blow-hole-containing blank, means for inverting the blank-containing mold, a vertically-movable support for the inverted mold, and blowing means including a movable nozzle for completing the article in the inverted mold.

27. In a machine for making glass articles including a mold, the combination of a pair of seat supports or stands for the mold, means for pressing in the mold on one of said seat-supports, a blow-hole-containing blank, blowing means for completing the article in the mold on the second seat-stand, and means for firmly supporting the molds on the separate seat-stands during the separate operations.

28. In a machine for making glass articles, the combination of an arm, means actuated by hand swinging said arm in a circular path, a mold formed of two hinged sections and carried by said arm, a pivoted catch for locking the closed mold, a spring-retracted rod connected with said catch, and a fixed cam for moving the rod and catch against the tension of the spring to release the mold.

29. In a machine for making glass articles, the combination of a rotatable support, a tubular arm or shaft extending radially therefrom, a two-part mold carried by said arm, a fixed cam, a rod slidable in the tubular arm and engaged by the cam, a pivoted catch for locking the mold parts, and a sleeve connected with the rod and having a cam-slot engaging with said catch.

30. In a machine for making glass articles, the combination of an open-ended mold, means for forming therein a blow-hole-containing blank, means for inverting the blank-containing mold, a vertically-movable support for the inverted mold, and a bottom-forming plunger movably mounted in said support and adapted to be removably inserted through the lower end of the inverted mold to form the bottom of the finished article.

31. In a machine for making glass articles, the combination of an open-ended mold, means for inverting the blank-containing mold during movement of the latter, a support for the inverted mold, means including a fixed cam and a bell-crank lever for raising and lowering said support, a plunger-former for forming the bottom of the finished article movably mounted in said support, and means including a fixed cam and lever connections for removably inserting the plunger into the lower end of the inverted mold.

32. In a machine for making glass articles, the combination of an open-ended mold, means coacting with said mold for forming therein a blow-hole-containing blank, means for inverting the blank-containing mold, a support for the inverted mold, a blow-tube nozzle vertically movable into the upper end of the inverted mold, and a bottom-forming plunger movable into the lower end of the inverted mold and receding therefrom in the blowing operation.

33. In a machine for making glass articles, the combination of a mold, a vertically-movable support for the mold, said support and mold adapted to swing in a circular path, a cam in the path of said support operating to raise the latter in position to support the mold, and means for shifting the cam to release the support and permit its retraction.

34. In a machine for making glass articles, the combination of an open-ended mold, a vertically-movable stand for the mold, said stand and mold adapted to move in a circular path, a pivoted cam in the path of the stand arranged to be shifted a predetermined distance by the stand and thereafter to elevate the latter into position to support the mold, a stop for limiting the movement of the cam, and means for retracting the cam to permit retraction of the stand.

35. In a machine for making glass articles, the combination of an open-ended mold, a vertically-movable stand for the mold, said stand and mold adapted to move in a circular path, a pivoted cam in the path of the stand arranged to be shifted a predetermined distance by the moving stand and thereafter to elevate the latter into position to support the mold, a stop for limiting the movement of the cam, and a vertically-movable latch arranged to engage the aforesaid cam and retract it to permit the descent of the stand.

36. In a machine for making glass articles, the combination of an open-ended mold, a blank-forming shell or tube insertible in the upper end of the mold, a vertically-movable stand for the mold, a blow-hole-forming plunger movable in an aperture of the stand, a lever 15 for elevating said plunger into the lower end of the mold, a pivoted cam for elevating the stand into position to support the mold, and a latch or trip carried by said lever for engaging the cam to retract it and permit the descent of the stand.

37. In a machine for making glass articles, the combination of an open-ended mold, a blank-forming tube or shell insertible in the upper end of the mold, a vertically-movable stand for the mold, a blow-hole-forming plunger movable in an aperture in the stand to enter the lower end of the mold, a pivoted cam adapted in one position to engage and elevate the stand into position to support the mold, a pivoted lever 15, a rod between the lever and plunger to effect the elevation of the latter, and a spring-controlled latch carried by the lever and adapted in the movement of the latter to engage the cam to retract it and release the stand.

38. In a machine for making glass articles, the combination of an open-ended mold, a blank-forming tube or shell insertible in the upper end of the mold, a vertically-movable stand for the mold, a blow-hole-forming plunger movable in an aperture in the mold to enter the lower end of the latter, means for elevating the stand into position to support the mold, a lever having a rod for engaging and elevating said plunger, and also carrying a trip or latch to engage said means and release the stand, and means for moving said lever.

39. In a machine for making glass articles, the combination of an open-ended mold, a blank-forming tube or shell insertible in the upper end of the mold, an upper plunger insertible through the tube, an upper lever connected with said plunger, a lower lever, a fluid-pressure cylinder on the lower lever, a piston in the cylinder the rod of which is connected with the upper lever, a vertically-movable stand for the mold, a pivoted cam adapted to elevate the stand into position to support the mold, a blow-hole-forming plunger movable in an aperture in the stand to enter the lower end of the mold, a rod carried by the lower lever arranged to engage the last-named plunger and force it into the mold, and a trip arm or latch carried by the lower lever arranged to engage the cam and move it to release said stand.

40. In a machine for making glass articles, a fixed shaft carrying a plurality of fixed cams, a table rotatable about said shaft, a two-part invertible mold, rotatable with the table, locking and releasing means for the mold operated by one of said cams, supports for the mold in its normal and inverted positions, means for moving one of said supports operated by another of said cams, a bottom-forming plunger, means for operating said plunger controlled by another of said cams, and blowing means including a nozzle operated to enter the mold by another of said cams.

41. In a machine of the character described, a circular table rotatable about a shaft, a plurality of mold-supporting seat-stands arranged in pairs, a mold for each pair of stands, means for imparting to the mold a movement to invert it from one seat-stand to the other, a blow device for each mold arranged in vertical alinement with one of the seat-stands of each pair, a valve-controlled air-supply common to each blow device, the seat-stands, the molds, the blow devices and the valve-controlled air-supply maintaining their coöperative relation during the rotation of the table.

42. In a machine for making glass articles and in combination, a circular table having peripheral cogs, rotatable about a shaft and carrying a plurality of mold-supporting stands, a worm mounted tangential to the table and engaging said cogs, a clutch member fixed to said worm, a clutch member operated from a source of power, hand-controlled means for effecting the intermittent rotation of the table, a plurality of molds, plungers adapted to operate within the opposite ends of the mold, and hand-controlled means for actuating the plungers.

43. In a machine for making glass articles and in combination, a rotatable table, a plurality of molds carried thereby a blow-nozzle for each mold, means for automatically inserting it therein, an air-controlling valve arranged to communicate with the blow-nozzles successively, means for effecting the intermittent rotation of the molds and the blow-nozzles at the same speed, and means for maintaining the air-pressure in the mold during such rotation.

44. In a machine for making glass articles, a circular table rotatable about a shaft and having a peripheral series of teeth, mold-supporting stands carried by said table, a series of studs or projections on said table, a constantly-driven shaft carrying a clutch member, a worm engaging the said teeth and connected with a companion clutch member, and means controlled by hand for effecting the engagement and release of said clutch members, and for interposing a stop in the path of said studs successively.

45. In a machine for making glass articles, and in combination with a two-part or divided mold, a hollow shaft on which it is mounted having slots 99, a rod within the hollow shaft having pins passing through said slots, a slotted collar 102 fixed on said shaft, a latch pivoted to one part of the mold, engaging said slotted collar, and adapted to engage a lug 106 on the other mold part, a central shaft, and a cam 103, fixed thereon and adapted to force the rod outward to effect the engagement of the latch with the mold-lug, and a spring on the hollow shaft to press it inward to release the latch from the lug.

46. In a machine for making glass articles and in combination, a plurality of molds, a blow-nozzle for each mold, means automatically for effecting the insertion of the nozzle into the mold, a flexible tube connecting each nozzle with the air-pressure supply, means for controlling the air-pressure in the blowing operation consisting of a rotating table carrying the molds and the blowing devices, a valve member carried by the table and having a plurality of ports one connecting each air-tube, a fixed valve member supplementing the rotating valve member and having a single port registering with the ports of the rotating member, and causing the air to remain under pressure in the mold during each intermittent movement of the table.

47. In a machine for making glass articles, and in combination with a mold open at both ends, a seat-stand for the open bottom of the mold, a bottom-forming plunger centrally within the seat-stand, a blow device in central alinement above the neck-forming end of the mold, means automatically to raise and lower the seat-stand in its relation to the mold, means automatically to raise the bottom-forming plunger within and to withdraw it from the mold, and means automatically to insert the blow device within the neck-forming end of the mold and to withdraw it therefrom in the operation of blowing the article.

48. In a machine of the character described, a bed-plate, a vertical shaft central thereon, a table rotatively mounted on the shaft, a plurality of mold-seats arranged in pairs side by side on the table around and in equal distance from the shaft, a mold for each pair of seat-stands mounted for inversion from one seat-stand to the other of the pair in the operations of pressing and blowing the article, means arranged beneath and above the bed-plate and operating in and upon one of each pair of the seat-stands for forming the neck and body of the article in one position of the mold, and means operating the devices for forming and blowing the article in the reversed position of the mold upon the adjacent seat-stand and means for intermittently rotating the table.

49. In a machine of the character described, a bed-plate, a vertical shaft fixed thereon, a table rotatively mounted on the shaft, a plurality of mold seat-stands arranged in pairs side by side around and equidistant from the shaft, a plurality of molds one for each pair of seat-stands, means for inverting each mold from one seat-stand to the other of the pair, a plurality of blow devices and means for operating the one for each mold arranged above the molds, a valve central with the shaft having communication with each blow device and with a compressed-air supply, means for intermittently rotating the table and means for maintaining the mold on the blowing seat-stand a longer time than on the pressing seat-stand.

50. In a machine of the character described, a bed-plate, a vertical shaft thereon, a table rotatively mounted on the shaft, a plurality of mold seat-stands arranged in pairs side by side on the table around and equidistant from the shaft, a plurality of molds one for each pair of seat-stands, means below and above the bed-plate and above the rotating table arranged in vertical alinement for operation with the mold in forming the blow-hole and body of the blank, means below and above the table in alinement for operation in blowing the article, means for inverting and transferring the mold out of alinement with one seat-stand into alinement with the other of the pair of seat-stands, and means for elevating the seat-stands to seat the mold in its transfer from one stand to the other and in alinement in each position with the pressing and the blowing devices.

51. In a machine of the character described, a bed-plate, a vertical shaft thereon, a table rotatively mounted on the shaft, a plurality of seat-stands arranged in pairs side by side on the table around and equidistant from the shaft, a plurality of molds one for each pair of seat-stands in their separate use for forming and blowing the article, upper and neck-forming plungers for the pressing seat-stands, a bottom-forming plunger and a blow-nozzle for each of the other seat-stands of the pair, these parts mounted to rotate together with the table and operated in the order described, a lever device for lifting each of the neck-forming plungers and levers for lifting the bottom-forming plungers of each of the other seat-stands of the pair in the blowing operation, means for operating the levers and means for rotating the table.

52. In a machine of the character described, a bed-plate, a vertical shaft thereon, a table rotatively mounted on the shaft, pairs of seat-stands 6 and 66 carried by the table around and equidistant from the shaft, a plurality of molds one for each pair of seat-stands, a cam 12 fixed on the bed-plate for lifting the seat-stand 6, a blow-hole-forming plunger 11 within the seat-stand, a lever 15, mounted on the bed-plate for lifting said plunger into the mold, a body-forming shell in the mold, an upper plunger for operating within the shell, a lever 21 for operating said plunger, a vertically-slidable power-cylinder pivotally connected to the lower lever, a piston-rod actuated by the power-cylinder and connected to the upper lever 21 a valve for controlling the air-supply to the cylinder, and a hand-actuated lever for controlling the valve to control the operation of the plungers.

53. In a machine of the character described, a bed-plate, a vertical shaft thereon, a table vertically mounted on the shaft, pairs of seat-stands 6 and 66 carried by the table around and equidistant from the shaft, a plurality of molds, one for each pair of seat-stands, a lever 69 mounted to rotate with the table for lifting the seat-stand 66, a bottom-forming plunger 71 within the seat-stand, a lever 72 for lifting said plunger, a cam 109 fixed on the shaft for operating the stand-lifting lever, and a cam 115 on the bed-plate for operating the plunger-lifting lever 72, an overhead blow-nozzle carried by the table one for each mold, a lever 79 for vertically operating the blow-nozzle, and a cam 84 on the fixed shaft for actuating the lever 79, a valve formed of a fixed and a rotating part, an air-supply tube connecting to the fixed valve part which latter is concentric with the shaft, and a flexible tube connecting the rotating valve part with the blow-nozzle for operation as stated.

54. In a machine of the character described, a bed-plate, a vertical shaft thereon, a table rotatively mounted on the shaft, a plurality of seat-stands carried by the table in pairs side by side and equidistant from the shaft, a plurality of molds one for each pair of stands, suitable means coacting with the stands and molds for pressing and for blowing the article, means for supporting and inverting each mold consisting of a sleeve 92, supported in suitable bearings on the table, a segmental rack 96 on the table, a half-gear fixed on the sleeve resting on and engaging the rack, and stops on said rack to limit the travel of the pinion to a semirevolution, whereby the mold is inverted from the press-forming stand to the blow-nozzle stand.

55. In a machine of the character described, a bed-plate, a vertical shaft thereon, a table rotatively mounted on the shaft, a plurality of seat-stands carried by the table in pairs side by side and equidistant from the shaft, a plurality of hinged molds one for each pair of stands, a sleeve 92 fixed to and supporting the mold in bearings on the table, a segmental rack on the table, a half-gear fixed on the sleeve resting on and engaging the rack and limited in its movement to a semirevolution on the rack to invert the mold from one seat-stand to the other, a rod longitudinally movable within the sleeve, stops on the sleeve to limit such movement of the rod, a coil-spring on the sleeve constantly forcing the rod to the limit of its inward movement, a cam on the fixed shaft for moving the rod outward, and means actuated by said rod for locking and unlocking the hinged mold parts during the revolution of the table.

56. In a machine of the character described, and in combination a rotating table, a plurality of seat-stands carried by the table in pairs, side by side, a plurality of hinged molds one for each pair of seat-stands, means for inverting a mold from one seat-stand to the adjacent seat-stand, means for press-forming the blank, in the mold on one stand, means for blowing the bottle in the same mold on the adjacent stand, means for rotating the table intermittently by fifths of the circle, means automatically to open the mold for the removal of the blown bottle consisting of a latch for locking the hinged mold parts together, a sleeve on the end of which the mold is fixed, a rod within the sleeve, a collar 101 having an oblique slot 102 engaging one end of the latch and fixed to the rod by a pin passing through slots in the sleeve, a coiled spring on the sleeve connected to and constantly tending to force the oblique collar to hold the latch firmly locked, and a cam engaging the inner end of the rod and adapted to force its obliquely-slotted collar to unlock the latch to allow the mold to be opened.

57. In a machine of the character described, and in combination, a rotating table, a plurality of seat-stands carried thereby in pairs side by side, a plurality of invertible molds one for each pair of seat-stands, means for limiting the inversion of the mold to half a circle corresponding to the space between the seat-stands so that each mold is rotated from one seat-stand to the other of the pair, lower and upper plungers and means for actuating each in opposite directions to press the blow-hole and the body of the blank within the mold on one seat-stand, a bottom-forming plunger and a blow-nozzle, and means for actuating each in opposite directions to form the bottom and blow the bottle in the inverted mold on the other seat-stand of the pair.

58. In a machine of the character described, a rotating table, a plurality of seat-stands carried thereby grouped in pairs side by side, a vertical neck-forming plunger for each pair, an upper plunger in alinement with the center of one of the mold-stands, and a vertically-movable overhead blow-nozzle in alinement with the center of the other mold-stand, a mold for each pair of seat-stands and means for inverting the mold from one seat-stand to the other, means for inserting the plungers and the blow-nozzle into the mold when seated and means for withdrawing the plungers and the blow-nozzle from the mold to allow of its inversion from one stand to the other.

59. In a machine of the character described, a mold, a pair of pressing-plungers therefor one operating in each end of the mold, a lever 15 for actuating the lower plunger, a lever 21 for actuating the upper plunger, a motor for actuating the levers consisting of a power-cylinder pivotally connected to and supported upon the end of the lower lever, a piston in the cylinder, the upper lever connected to the rod of the piston, a valve on the cylinder controlling the entrance of the motive fluid therein to cause the descent of the cylinder and the ascent of the piston-rod, a lever for controlling the valve for causing both plungers to be forced into the mold successively and to be withdrawn from the mold successively, a stop to limit the ascent of the cylinder and a stop to limit the descent of the piston.

60. In a machine of the character described, a mold, a pair of plungers therefor one operating in each end of the mold, a lever for actuating the lower plunger in forming the neck and the blow-hole of the article, a lever for actuating the upper plunger to form the body of the article, a compressed-air motor for actuating the levers consisting of a vertically-movable cylinder connected with the lower lever, a piston and its rod connected with the upper lever, a valve in said cylinder, a pipe connecting the valve with the fluid-supply and means for controlling the valve for holding the plungers under air-pressure in operative position to the mold.

61. In a machine of the character described, a mold, a plunger for forming the bottom of the article, a blow-nozzle, a guide-arm therefor, a lever pivotally mounted on the guide-arm and engaging the stem of the blow-nozzle, a cam adapted to lift the lever to hold the blow-nozzle in operative position, means for firmly holding the blow-nozzle in operative position, a lever engaging the bottom-forming plunger, a cam adapted to actuate the lever to cause it to descend in the mold while supporting the bottle as it is being blown, and means connecting the blow-nozzle with the compressed-air supply.

62. In a machine of the character described, a bed-plate, a vertical shaft thereon, a table rotatively mounted on the shaft, a plurality of seat-stands carried by the table in pairs, side by side and equidistant from the shaft, a plurality of molds one for each pair of stands, means for inverting a mold from one seat-stand to the other seat-stand of the pair, pressing-plungers vertically operative in each seat-stand, an upper pressing-plunger and an overhead blow-nozzle arranged vertically in alinement with the stand-plungers for pressing the blank in the mold on one stand and for blowing the finished article in the same mold on the adjacent stand, means for supplying the blow-nozzle with compressed air, means for rotating the table intermittently in fifths of the circle, and means controlling the air-supply to the blow-nozzles whereby to cause the air to remain under pressure in the blown bottle during one-fifth of the rotation of the table.

63. In a machine of the character described, a bed-plate, a vertical shaft thereon, a table vertically mounted on the shaft, a plurality of seat-stands carried by the table in pairs side by side and equidistant from the shaft, a plurality of molds one for each pair of stands, means for inverting a mold from one seat-stand to the adjacent seat-stand, means for press-forming the blank in the mold on one stand, means for blowing the bottle in the same mold on the adjacent stand, means for rotating the table intermittently by fifths of the circle, means for controlling the air-supply to each mold during one-fifth of the rotation of the table, and means automatically to open the mold for the removal of the blown bottle.

64. In a machine of the character described, a circular table rotatable about a fixed vertical shaft, an arm or tubular shaft supported on said table, a mold of hinged sections one of which is fixed to said tubular shaft, a latch pivoted on the shaft-connected mold-section, adapted to engage the other mold-section, a spring-retracted rod within the tubular shaft, a collar on the rod having an oblique slot engaging one end of the latch, and means whereby the rod is moved longitudinally and caused to maintain the engagement of the latch with the mold-section and a spring operatively connected to retract the rod to release the engagement of the latch with the mold.

65. In a machine for making glass articles including a rotatable table, a rotatable shaft radial thereon, a mold fixed on one end thereof, the other end of said shaft supported in a bearing, a segmental pinion on said shaft between the mold and said end bearing and a segmental rack for the pinion provided with stops for limiting its rotation in its travel on the rack to invert the mold, the bearing for the shaft and the rack-support for the pinion being fixed upon the table and the mold and its shaft movable in the arc of a circle on its inner end independent of the movement of the table and only to an extent required to invert the mold.

In testimony whereof I affix my signature in presence of two witnesses.

HARRY SEMPLE.

Witnesses:
A. E. H. JOHNSON,
GUY H. JOHNSON.